United States Patent
Chan et al.

(10) Patent No.: US 7,064,588 B2
(45) Date of Patent: Jun. 20, 2006

(54) HALF-BRIDGE INVERTER OF DUAL N-MOS WITH A PUSH/PULL CONTROL CHIP

(75) Inventors: Chun-Kong Chan, Hsi Chih (TW); Jeng-Shong Wang, Hsin Chuang (TW)

(73) Assignee: Lien Chang Eletronic Enterprise Co., Ltd., Taipei Count (TW)

( * ) Notice: Subject to any disclaimer, the term of this patent is extended or adjusted under 35 U.S.C. 154(b) by 15 days.

(21) Appl. No.: 10/959,148

(22) Filed: Oct. 7, 2004

(65) Prior Publication Data
US 2006/0076986 A1    Apr. 13, 2006

(51) Int. Cl.
*H03B 1/00*      (2006.01)
*H03K 3/00*     (2006.01)

(52) U.S. Cl. ..................... 327/110; 327/112
(58) Field of Classification Search ................ 327/110, 327/112, 494, 508, 587, 104
See application file for complete search history.

(56) References Cited

U.S. PATENT DOCUMENTS 5,677,602 A * 10/1997 Paul et al. ................. 315/224
5,977,723 A * 11/1999 Yoon ........................... 315/247
6,362,575 B1 * 3/2002 Chang et al. ................ 315/224
6,522,089 B1 * 2/2003 Duong et al. ................ 315/308
6,680,585 B1 * 1/2004 Trestman .................... 315/291
6,949,006 B1 * 9/2005 Chen et al. ..................... 451/5

FOREIGN PATENT DOCUMENTS

JP           06022560        * 1/1994

* cited by examiner

*Primary Examiner*—My-Trang Nu Ton
(74) *Attorney, Agent, or Firm*—Rosenberg, Klein & Lee (57) ABSTRACT

A circuit making use of a push/pull-type control chip to drive a half-bridge inverter of dual N-MOS connects a drive circuit to a conventional half-bridge inverter circuit, and has a push/pull-type control chip having two output terminals, a drive circuit having two input terminals and two output terminals, and a half-bridge switch assembly having a first N-MOS FET and a second N-MOS FET. The two input terminals of the drive circuit are connected with the two output terminals of the push/pull control chip and controlled by the push/pull-type control chip. Each of the two N-MOS FETs of the half-bridge switch assembly has a control terminal, which is connected to one of the two output terminals of the drive circuit and driven by the drive circuit for converting a DC power source into an AC power source sent to the primary side of a transformer.

4 Claims, 9 Drawing Sheets

HALF-BRIDGE INVERTER OF DUAL N-MOS WITH A PUSH/PULL CONTROL CHIP

BACKGROUND OF THE INVENTION

1. Field of the Invention

The present invention relates to a half-bridge inverter of a dual N-MOS with a push/pull control chip, and more specifically relates to a push/pull control chip controlling the half-bridge switch assembly composed of two N-MOS FETs for driving the load.

2. Description of the Related Art

The power supply for a backlight source of a TFT LCD panel makes use of an inverter circuit to accomplish energy conversion and turn a cold cathode fluorescent lamp (CCFL) on. Conventional inverter circuits can be divided into half bridge-type, full-bridge type and push/pull-type according to different circuit topologies. An inverter circuit is a circuit for converting DC power into AC power.

Figure 1:
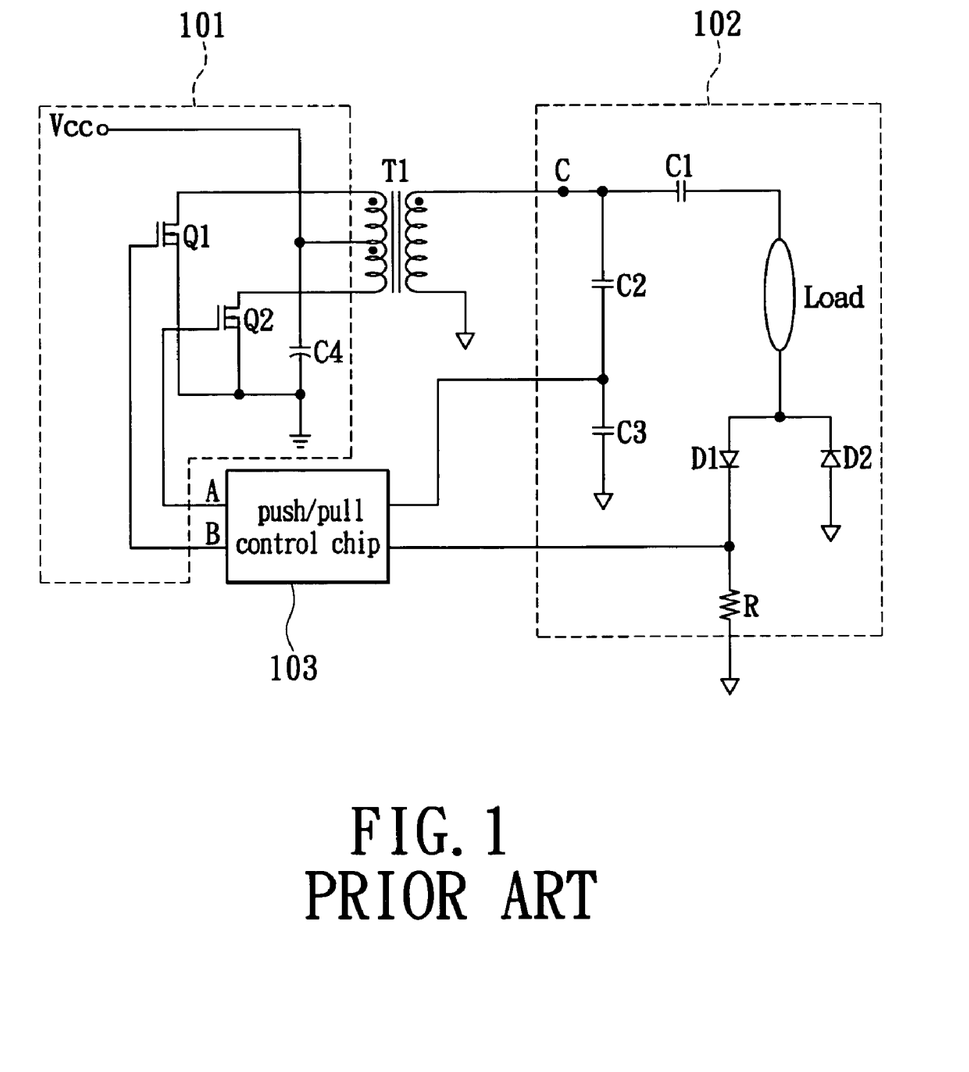
FIG. 1 is a circuit diagram showing how a conventional push/pull-type inverter circuit drives a load.
Figure 2:
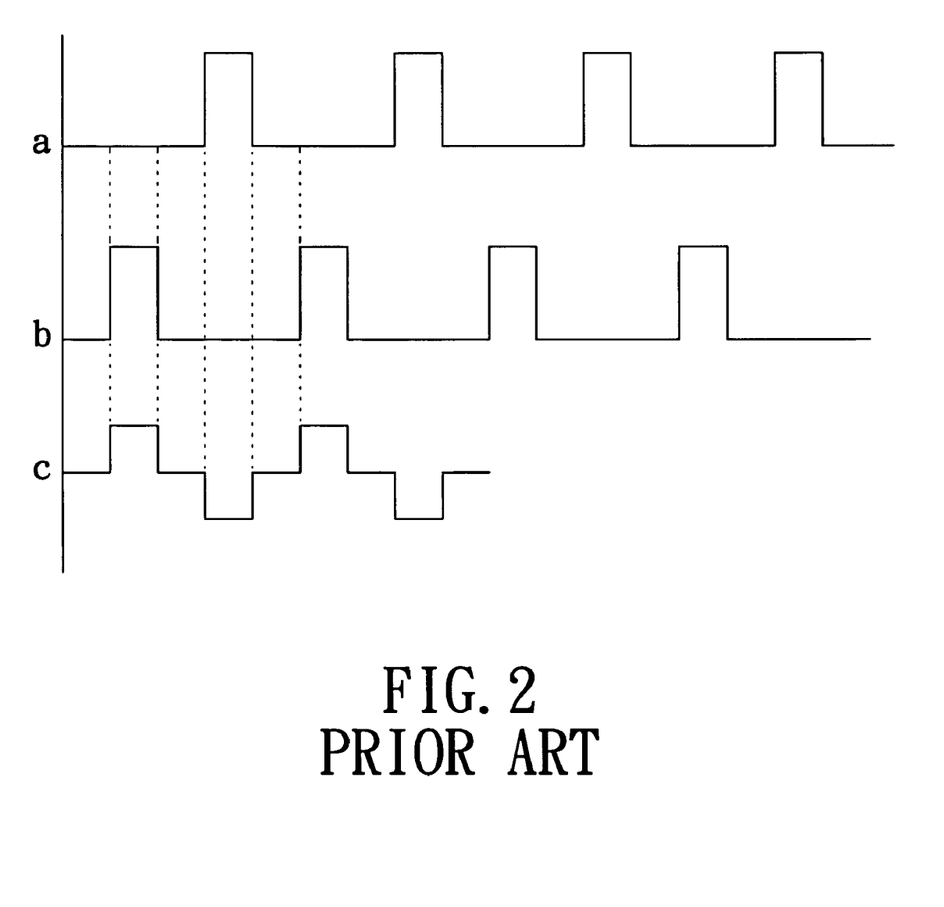
FIG. 2 is a waveform diagram of control signals output by a conventional push/pull-type control chip and an output voltage at the load end.

As shown in FIG. 1, a transformer T1 divides the circuit into a front-end circuit at the primary side 101 and a rear-end circuit at the secondary side 102. The front-end circuit at the primary side 101 comprises a DC voltage source Vcc, a first switch Q1, and a second switch Q2. The rear-end circuit at the secondary side 102 comprises at least a capacitor (C1, C2, C3), a load, and at least a diode (D1, D2). A push/pull control chip 103 is connected between the front-end circuit at the primary side 101 and the rear-end circuit at the secondary side 102. Reference is also made to FIG. 2. The push/pull control chip 103 outputs a first control signal a and a second control signal b to turn switching actions of the two switches Q1 and Q2 at the primary side 101, respectively. DC power source Vcc is used to provide energy, and the transformer T1 raises and converts the voltage of DC power Vcc to the rear-end circuit 102 for driving the load. The output voltage waveform c at the secondary side of the transformer T1 is the voltage waveform at point C. As shown in FIG. 2, the output voltage waveform c at the secondary side is an AC voltage waveform.

In the above description, the push/pull control chip 103 can be the LX1686, LX1688 or LX1691 push/pull control chip produced by Linfinity (Microsemi) Corporation, the 02-9RR push/pull control chip produced by O2 Micro International Limited, or the BIT3494 and BIT3193 push/pull control chip produced by Beyond Innovation Technology.

Figure 3:
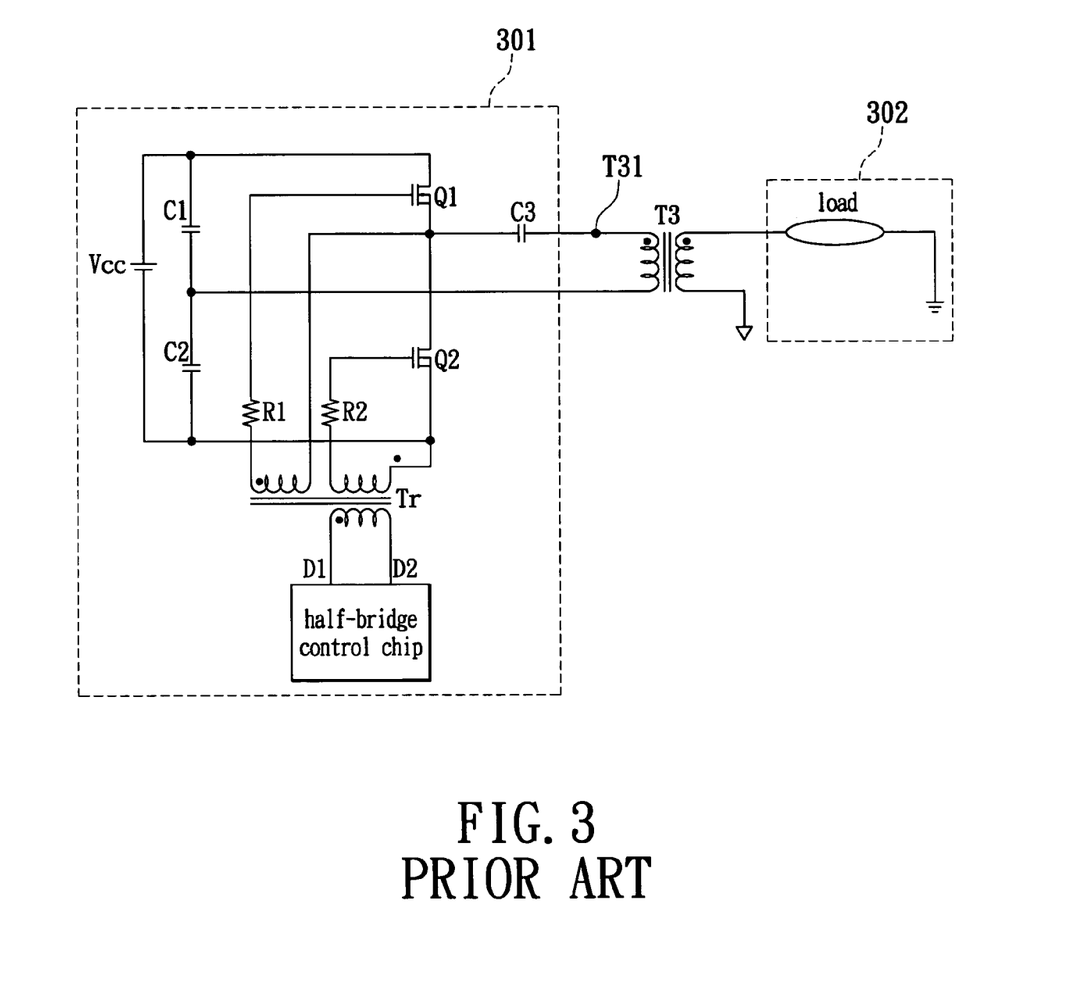
FIG. 3 is a circuit diagram showing how a conventional half bridge-type inverter circuit drives a load.
Figure 4:
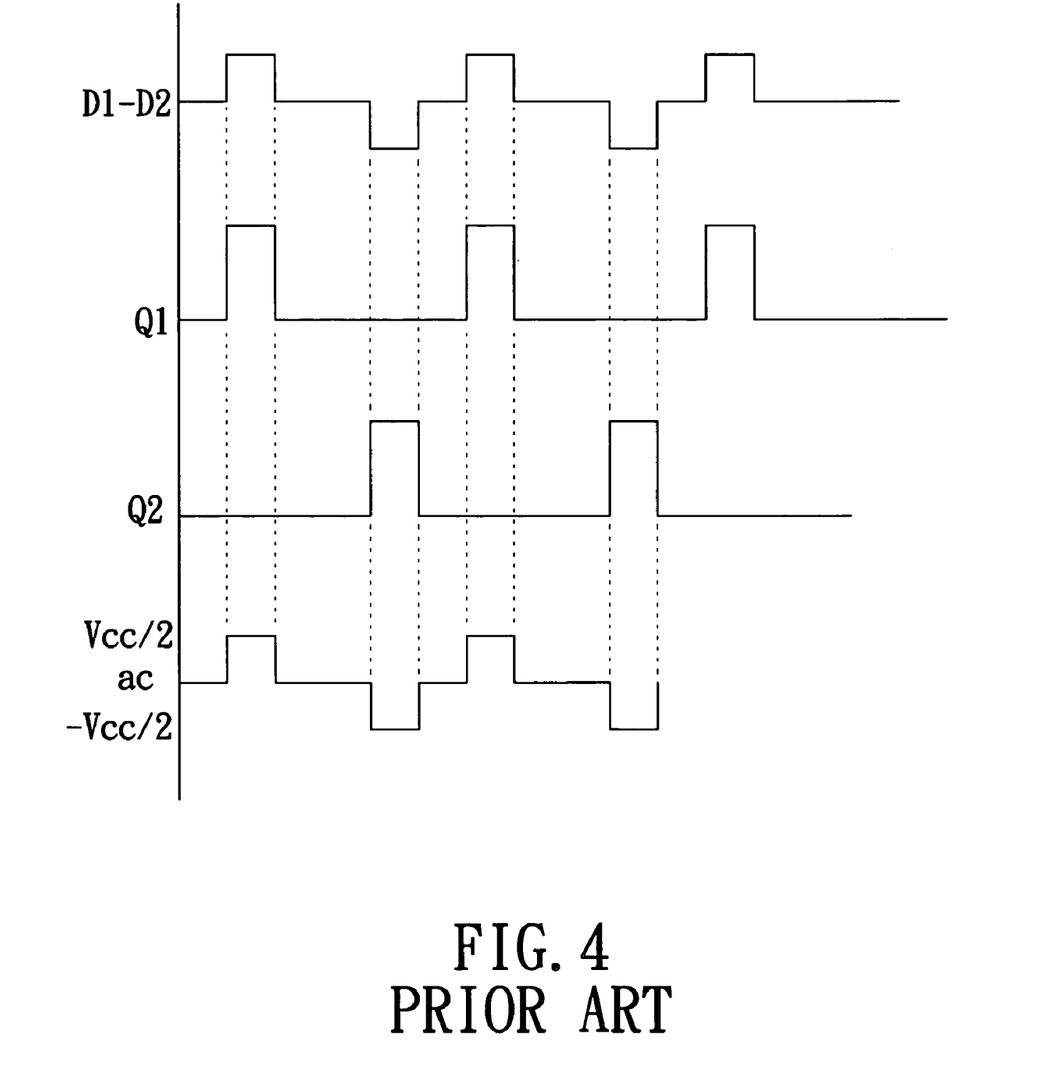
FIG. 4 is a waveform diagram of control signals output by a conventional half bridge-type control chip and an output voltage at the load end.

As shown in FIG. 3, a transformer T2 divides the circuit into a front-end circuit at the primary side 201 and a rear-end circuit at the secondary side 202. The front-end circuit at the primary side 201 comprises a DC voltage source Vcc, two electronic switches (Q1, Q2), a half-bridge control chip TL494, two capacitors (C1, C2) and an isolation transformer Tr. The rear-end circuit at the secondary side 202 comprises a load. Reference is also made to FIG. 4. The half-bridge control chip TL494 outputs control signals D1–D2 via two output terminals D1 and D2. The control signals D1–D2 control switching actions of the two electronic switches Q1 and Q2 via the isolation transformer Tr, respectively. The two electronic switches Q1 and Q2 are n-channel FETs or p-channel FETs. Through switching actions of the two electronic switches Q1 and Q2, electric energy stored in the capacitors C1 and C2 can be transferred to a primary side terminal T21 of the transformer T2 via a coupling capacitor C3 to form an AC power source ac. The voltage of the capacitors C1 and C2 is a half (Vcc/2) of the DC voltage Vcc. AC power source ac is used to provide energy for the transformer T2, which boosts and converts AC power source to the secondary side 202 for driving the load.

In the above description, if the inverter circuit used is of the half bridge-type, a half-bridge control chip needs to be matched for normal operations, while if the used inverter circuit is of the push/pull-type, a push/pull control chip needs to be matched for normal operations, hence having less flexibility and commonality in practical use. In other words, control chips can't be jointly used and purchased together, or a more complicated circuit needs to be matched.

SUMMARY OF THE INVENTION

Accordingly, one object of the present invention is to provide a circuit making use of a push/pull control chip to drive a half-bridge inverter of dual N-MOS. The circuit uses a driver to connect output terminals of the push/pull control chip and control terminals of a half-bridge switch assembly composed of two N-MOS FETs. The circuit is controlled by the push/pull control chip for driving switching actions of the half-bridge switch assembly.

In the circuit making use of a push/pull control chip to drive a half-bridge inverter of dual N-MOS of the present invention, a driver is connected between two N-MOS FETs of a conventional half-bridge inverter and a control chip. The control chip is replaced with a push/pull control chip to turn switching actions of the two N-MOS FETs.

In the above description, the driver comprises a high-frequency transformer, a second resistor, a damper and a diode. The high-frequency transformer has a first input terminal, a second input terminal, a first output terminal and a second output terminal. The first input terminal of the high-frequency transformer connects to a output terminal of the push/pull control chip through a RC serial circuit, the second input terminal of the high-frequency transformer connects to the reference terminal, the first output terminal of the high-frequency transformer connects to the control terminal of the first N-MOS FET through a first resistor, and the second output terminal of the high-frequency transformer connects to the primary winding of the transformer. The second resistor connects to the other output terminal of the push/pull control chip and the control terminal of the second N-MOS FET. The damper connects to the first output terminal and the second output terminal. The diode is connected in parallel with the second resistor.

In the above description, the present invention provides a circuit making use of a push/pull control chip to drive a half-bridge inverter of dual N-MOS. The circuit uses a driver to receive control signals of the push/pull control chip to turn switching actions of the half-bridge switch assembly composed of two N-MOS FETs.

The circuit of the present invention connects a driver to a conventional half-bridge inverter with a push/pull control chip matched for control, hence having a higher flexibility in practical use without being limited by the control chip. Moreover, it is only necessary to use the push/pull control chip for simultaneous control of push/pull inverter circuit and half-bridge inverter circuit.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 5:
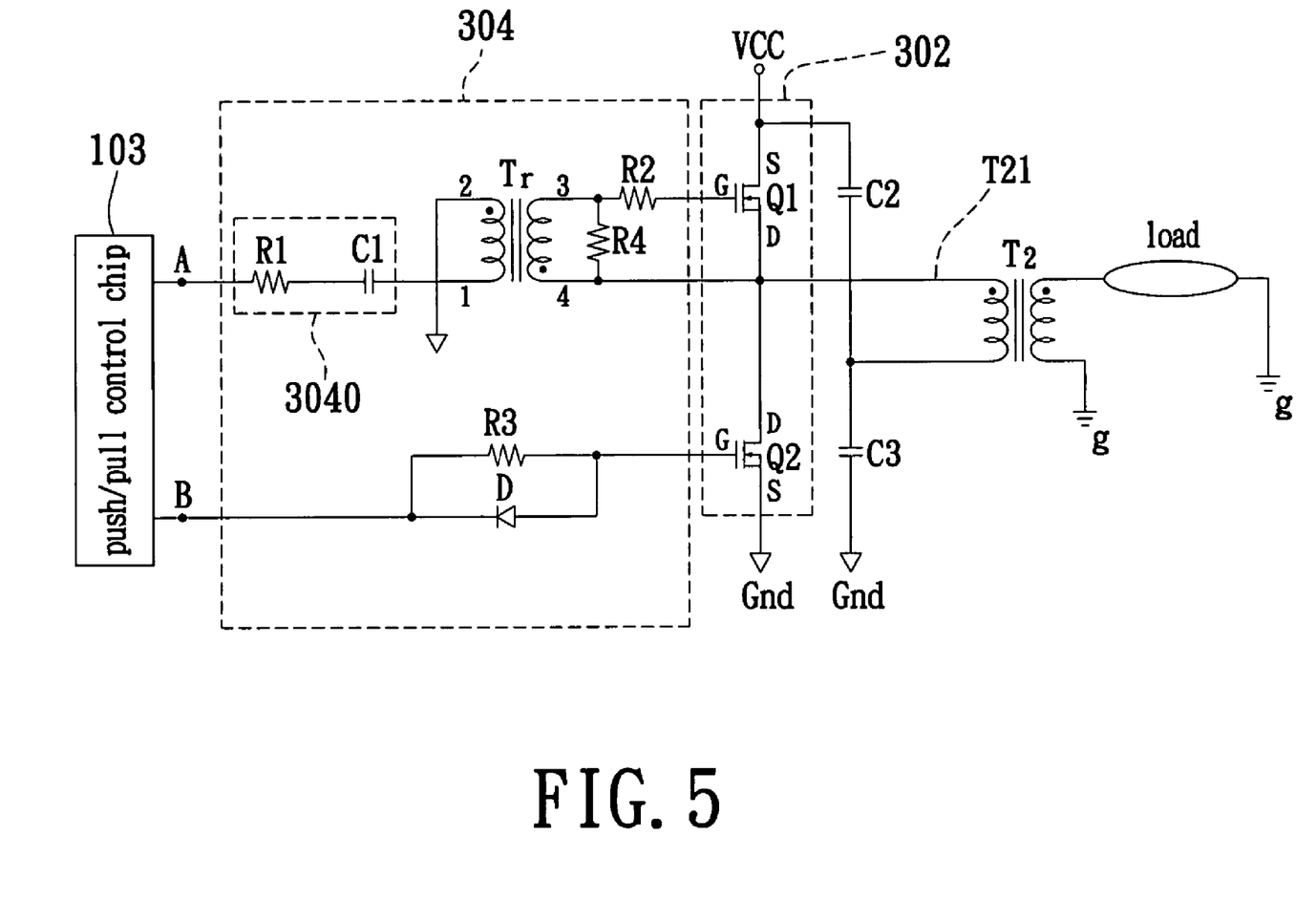
FIG. 5 is a circuit diagram of a first embodiment of the present invention.

As shown in FIG. 5, the present invention provides a circuit making use of a push/pull control chip to drive a half-bridge inverter of dual N-MOS. The circuit is connected to a primary side of a transformer T2 for converting a DC power source into an AC power source ac. AC power source ac provides energy for actions of the load via the transformer T2. The peak-to-peak value of the above AC power source ac is the voltage Vcc of DC power source.

Reference is again made to FIG. 5. The circuit making use of a push/pull control chip to drive a half-bridge inverter of dual N-MOS of the present invention comprises a push/pull control chip 103, a driver 304, a half-bridge switch assembly 302 and two capacitors (C2, C3). The push/pull control chip 103 has two output terminals A and B for outputting two control signals. The driver 304 has two input terminals and two output terminals. The two input terminals are connected to the two output terminals A and B of the push/pull control chip 103 and controlled by the push/pull control chip 103. The half-bridge switch assembly 302 is composed of two N-MOS FETs Q1 and Q2, each having a control terminal G. The two control terminals G are connected to the two output terminals of the driver 304 and driven by the driver 304 for switching DC power source Vcc to AC power source sent to the primary side of the transformer T2, respectively.

Reference is again made to FIG. 5. The source S of the N-MOS FET Q1 is connected to DC power source Vcc. The source S of the N-MOS FET Q2 is connected to a reference terminal Gnd. The drains D of the electronic switches Q1 and Q2 are connected to one terminal of the primary side of the transformer T2. The other terminal of the primary side of the transformer T2 is connected to the reference terminal Gnd via the capacitor C3 and to DC power source Vcc via the capacitor C2. The control terminals G of the N-MOS FETs Q1 and Q2 are connected to the two output terminals of the driver 304, respectively. The above two e N-MOS FETs Q1 and Q2 are connected to form the half-bridge switch assembly. The two N-MOS FETs Q1 and Q2 are driven in the positive half cycle or the negative half cycle to form AC power source ac at the terminal T21 of the primary side of the transformer T2.

Reference is again made to FIG. 5. The driver 304 is used to drive the two N-MOS FETs Q1 and Q2. The driver 304 connects to an output terminal A of the push/pull control chip 103 through a RC serial circuit 3040, the other terminal of the RC serial circuit connects to a first input terminal 1 of a high-frequency transformer Tr, and the high-frequency transformer Tr connects to the reference terminal Gnd with a second input terminal 2. A first output terminal 3 of the high-frequency transformer Tr connects to the control terminal G of the N-MOS FET Q1 through a first resistor R2, and a second output terminal 4 thereof connects to a primary winding T21 of a transformer T2. In the above description, the first input terminal 1 and the first output terminal 3 are in phase. Moreover, a damper R4 is connected between the first output terminal 1 and the second output terminal 3, and the damper R4 is used to prevent the N-MOS FET Q1 from burning down due to the Ringing of the high-frequency transformer Tr. Then the driver 304 connects an output terminal B of the push/pull control chip 103 and the control terminal G of the N-MOS FET Q2 with a second resistor R3, and a diode D is connected in parallel with the second resistor R3.

Figure 6:
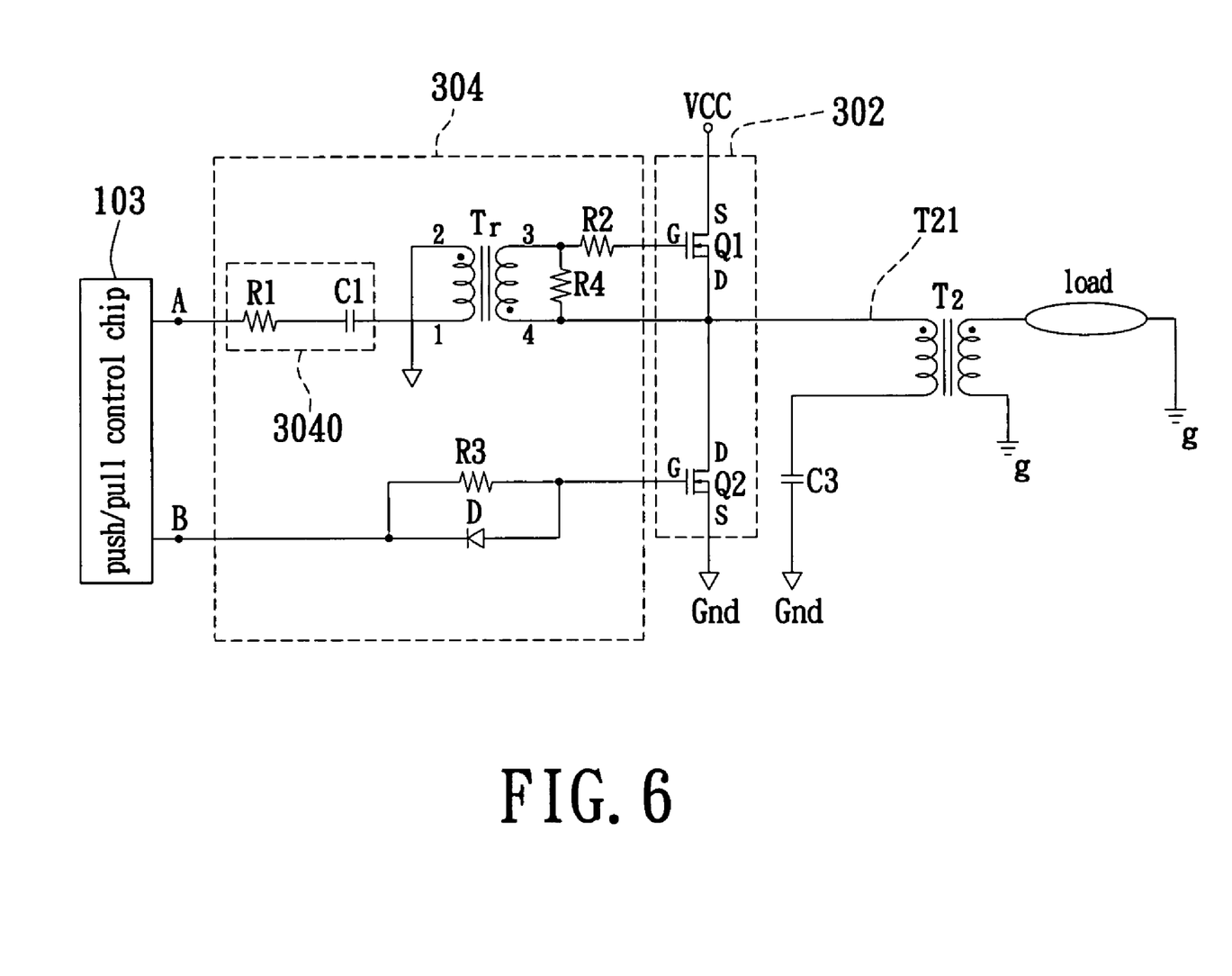
FIG. 6 is a circuit diagram of a second embodiment of the present invention.
Figure 7:
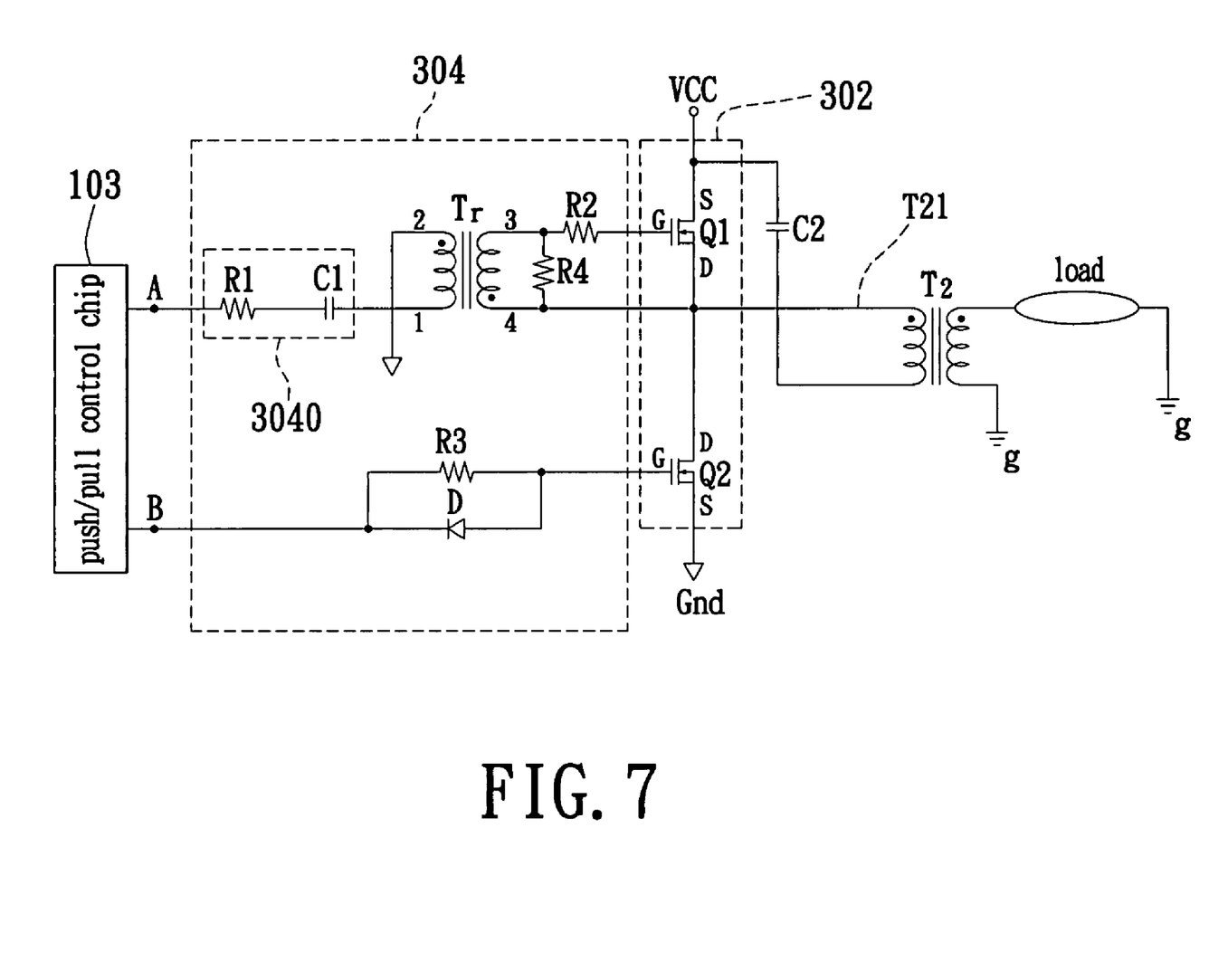
FIG. 7 is a circuit diagram of a third embodiment of the present invention.
Figure 8:
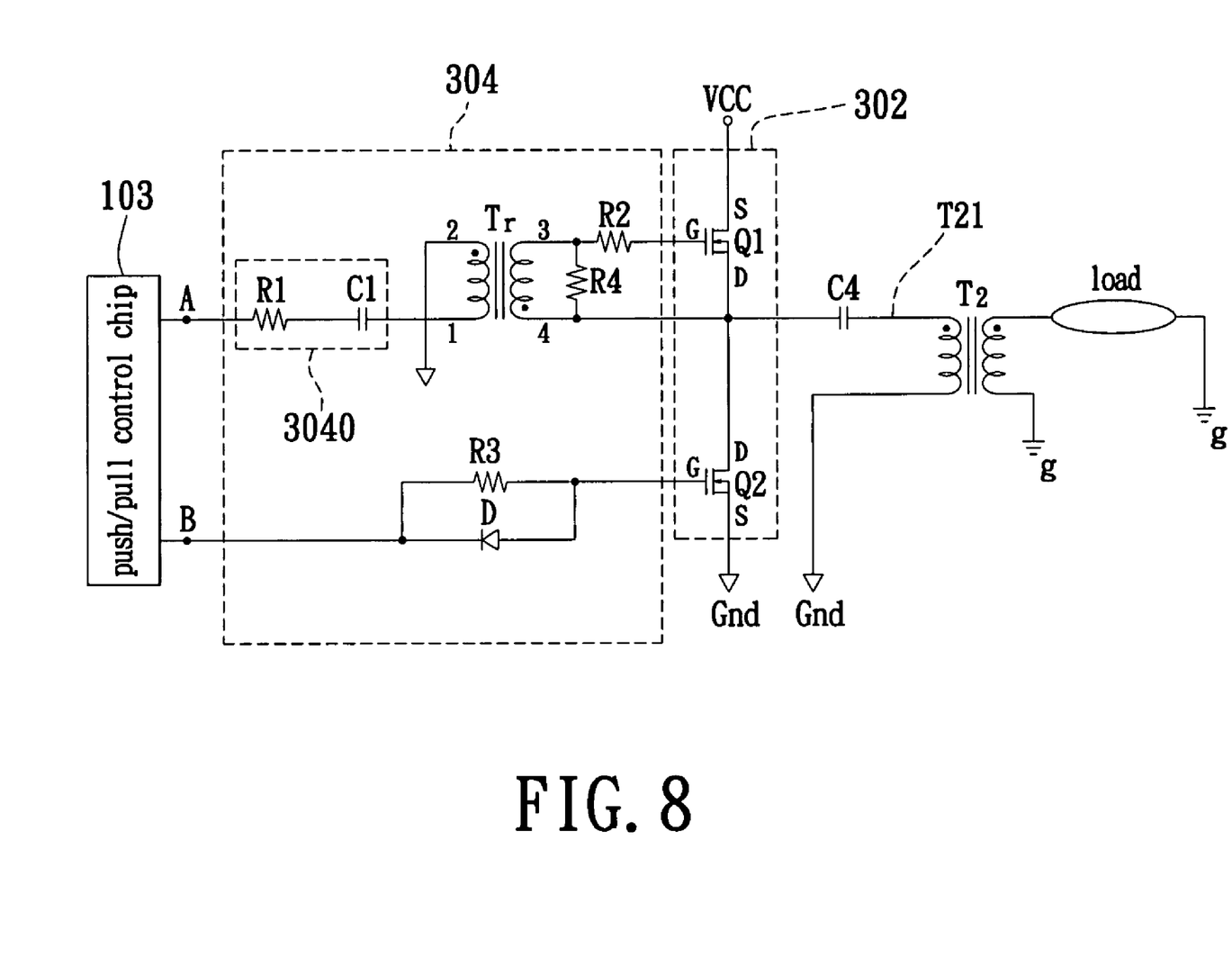
FIG. 8 is a circuit diagram of a fourth embodiment of the present invention.

The circuit diagrams shown in FIGS. 6–8 illustrate the embodiments of the present invention, and the connection location of the capacitors (C2, C3) thereof are different from those in FIG. 5. In the above description, the capacitors (C2, C3) are used to store DC power Vcc and send DC power Vcc to the transformer T2.

Figure 9:
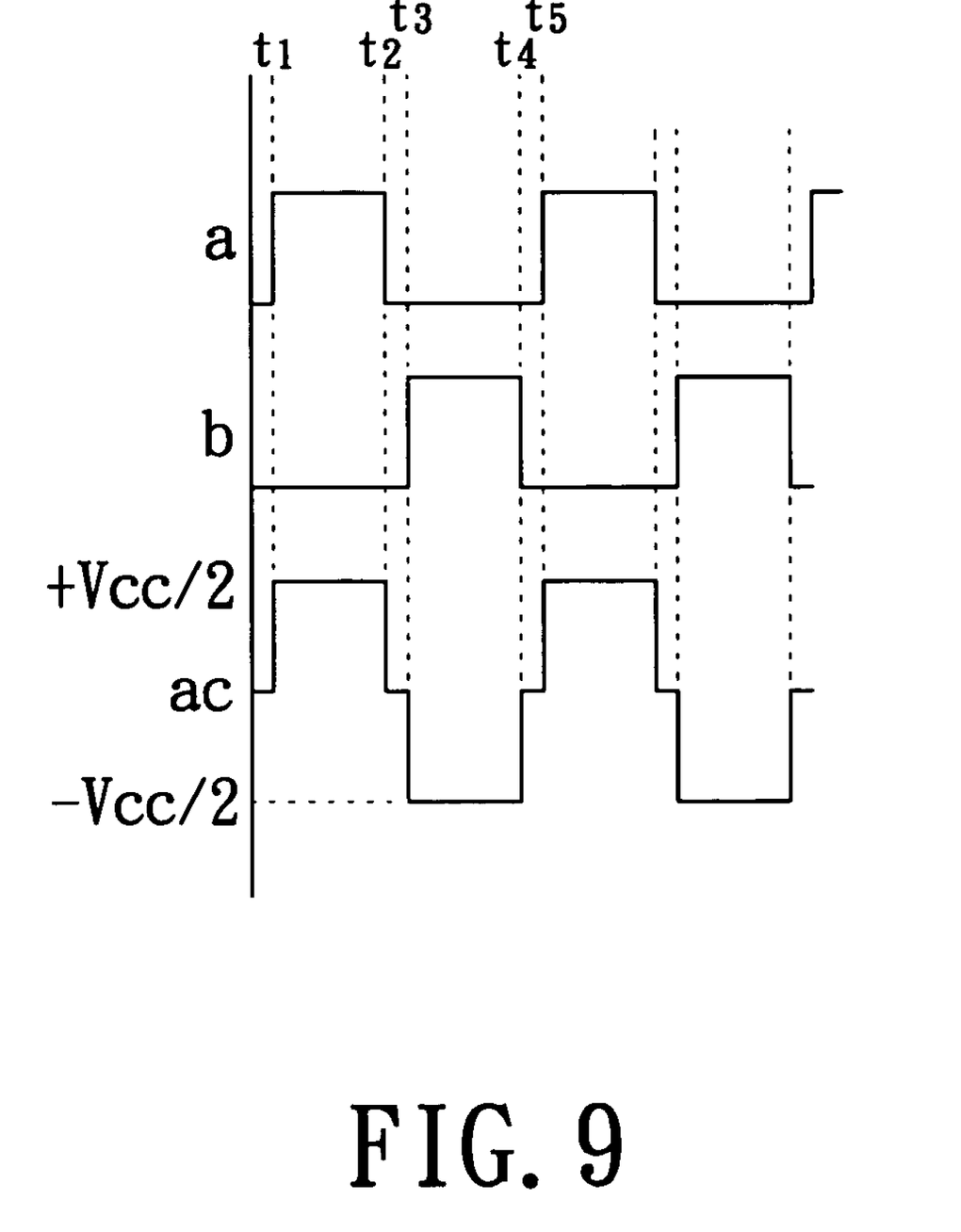
FIG. 9 is a waveform diagram of output signals of a push/pull control chip and the AC voltage according to the present invention.

Reference is made to FIG. 5 as well as FIG. 9. The output terminal A of the push/pull control chip 103 outputs a first control signal a, and the output terminal B thereof outputs a second control signal b. The clock of first and second control signals a and b are like the clock of POUT1 and POUT2 of the chip of type BIT3015 produced by Beyond Innovation Technology. The terminal T21 at the primary side of the transformer T2 can get an AC voltage waveform ac with a peak-to-peak value Vcc of DC power source.

Reference is made to FIG. 6 as well as FIG. 5. At time t1 to t2, the first control signal a is at the high level, while the second control signal b is at the low level. The first control signal a is sent to the first input terminal 1 of the high-frequency transformer Tr via the RC serial circuit 3040, and the first output terminal 3 of the high-frequency transformer Tr is induced with a high voltage to turn on the N-MOS FET Q1 via the control terminal G1 thereof. The second control signal b is sent to the control terminal G of the N-MOS FET Q2 via the second resistor R2 for turning off the N-MOS FET Q2. At this time, the N-MOS FET Q1 is on, while the N-MOS FET Q2 is off. Therefore, electric energy stored in the capacitor C2 can be sent to the primary side of the transformer T2 to obtain a positive voltage +Vcc/2 of the AC voltage waveform ac at the terminal T21. In the above illustration, the two N-MOS FETs Q1 and Q2 are driven at a positive half cycle.

Reference is made to FIG. 9 as well as FIG. 5. At time t2 to t3, the first control signal a drops from the high level to the low level, while the second control signal b is still kept at the low level. The first input terminal 1 of the high-frequency transformer Tr thus accepts the control signal at the low level. Therefore, the first output terminal 3 of the high-frequency transformer Tr is induced with a low voltage to turn off the N-MOS FET Q1 via the control terminal G1 thereof. In the above description, at time t2 to t3, both the N-MOS FET Q1 and Q2 are off. The primary side of the transformer T2 is thus open-circuited so that energy stored in the transformer T2 can be discharged. This is the energy discharge state. Therefore, the terminal T21 of the primary side of the transformer T2 receives a zero voltage of the AC voltage waveform ac.

Reference is made to FIG. 9 as well as FIG. 5. At time t3 to t4, the first control signal a is still kept at the high level, while the second control signal b rises from the low level to the high level. At this time, the N-MOS FET Q1 is off, while the N-MOS FET Q2 is on. Therefore, electric energy stored in the capacitor C3 can be sent to the primary side of the transformer T2 to obtain a negative voltage –Vcc/2 of the AC voltage waveform ac at the terminal T21. In the above illustration, the two N-MOS FETs Q1 and Q2 are driven at a negative half cycle.

Reference is made to FIG. 9 as well as FIG. 5. At time t4 to t5, the first control signal a is still kept at the low level, while the second control signal b drops from the high level to the low level. The states of the N-MOS FETs Q1 and Q2 are the same as those at time t2 to t3. Both the N-MOS FET Q1 and Q2 are off. The primary side of the transformer T2 is thus open-circuited so that energy stored in the transformer T2 can be discharged. This is the energy discharge state. Therefore, the terminal T21 of the primary side of the transformer T2 receives a zero voltage of the AC voltage waveform ac.

Reference is made to FIG. 9 as well as FIG. 5. At time t5 to t6, the action of the circuit making use of a push/pull-type control chip to drive a half-bridge inverter of dual N-MOS of the present invention and the voltage waveform ac obtained at the terminal T21 of the primary side of the transformer T2 repeats that of time t1 to t2. As stated above, the peak-to-peak value of the obtained AC power source is the voltage Vcc of DC power source. Moreover, AC power source is boosted and converted to the secondary side of the transformer T2 to provide energy for the load.

To sum up, the present invention provides a circuit making use of a push/pull-type control chip to drive a half-bridge inverter of dual N-MOS. The circuit connects a drive circuit 304 to a conventional half bridge-type inverter circuit with a push/pull-type control chip 103 matched for control, hence having a higher flexibility in practical use. Moreover, it is only necessary to use the push/pull-type control chip 103 for simultaneous control of push/pull-type inverter circuit and half bridge-type inverter circuit.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A half-bridge inverter of dual N-MOS with a push/pull control chip, connected to a primary winding of a transformer for converting DC power into AC power, the half-bridge inverter comprising:

a push/pull control chip having two output terminals;

a driver having two input terminals, two output terminals and a high-frequency transformer, wherein the two input terminals of the driver connect to the output terminals of the push/pull control chip, the driver being controlled by the push/pull control chip;

a half-bridge switch assembly consisting of a first N-MOS FET and a second N-MOS FET, wherein the first and the second N-MOS FETs connect to the two output terminals of the driver, respectively, through a control terminal to convert DC power into AC power by the driver, said high-frequency transformer including a first input terminal, a second input terminal, a first output terminal and a second output terminal, wherein the first input terminal of the high-frequency transformer connects to an output terminal of the push/pull control chip through a RC serial circuit, the second input terminal of the high-frequency transformer connects to the reference terminal, the first output terminal of the high-frequency transformer connects to the control terminal of the first N-MOS FET through a first resistor, and the second output terminal of the high-frequency transformer connects to the primary winding of the transformer;

a second resistor connects to the other output terminal of the push/pull control chip and the control terminal of the second N-MOS FET;

a damper connected between the first output terminal and the second output terminal of the high-frequency transformer; and a diode connected in parallel with the second resistor.

2. The half-bridge inverter of claim 1, further including a positive half cycle driver and a negative half cycle driver due to the first N-MOS FET and the second N-MOS FET.

3. The half-bridge inverter of claim 1, wherein the first and the second N-MOS FETs connect to the primary winding of the transformer with drain terminals, and connect to DC power and a reference terminal with source terminals, respectively.

4. The half-bridge inverter of claim 1, wherein the diode connects to the output terminal of the push/pull control chip with a negative pole terminal and connects to the control terminal of the second N-MOS FET with a positive pole terminal.

* * * * *